Patented Mar. 23, 1954

2,673,207

UNITED STATES PATENT OFFICE 2,673,207

PROCESS OF NEUTRALIZING CRUDE SULFONATES

Frederick W. Trusler, Toronto, Ontario, Canada, assignor to Colgate-Palmolive Company, a corporation of Delaware No Drawing. Application January 10, 1950,
Serial No. 137,898

16 Claims. (Cl. 260—400)

The present invention relates to a process of neutralizing acid sulphonation products to yield water-soluble organic sulphonates which have surface active properties adapting them for use as detergents, wetting agents, emulsifying agents and the like.

Among known surface active agents are many which may be classified as organic sulphonates since they are produced by reacting an organic compound having predominately hydrophobic properties with a sulphonating agent, thereby reintroducing one or more hydrophylic acid groups into the molecular structure, and then neutralizing the acid sulphonation product. The sulphur atom of the introduced group may be linked either directly to carbon to form a true sulphonate linkage or indirectly through an oxygen atom to form a sulfuric ester linkage, depending upon the molecular structure of the organic compound and the conditions prevailing during sulphonation. In this specification and the claims the terms "sulphonation" and "sulphonating" are used in the broad sense to cover both true sulphonation, i. e., the formation of a C-S linkage, and sulphation, i. e., the formation of a C-O-S linkage. Similarly the term "sulphonate" includes both types of resulting compounds.

In the sulphonating operation it is usual to employ a considerable excess of sulphonating agent in order to obtain a satisfactory yield. Ordinarily the excess sulphonating agent is subsequently neutralized along with the acid organic sulphonate. Hitherto this neutralization has generally been performed by treating the reaction mixture produced by the sulphonating operation (hereafter sometimes called the "crude sulphonate") with a strong aqueous alkali hydroxide solution such as caustic potash or soda, the said solution being brought into contact with the crude sulphonate under suitable conditions of agitation and cooling.

This method of neutralization is subject to various limitations and drawbacks, one of the greatest of these being that a partial decomposition of sulphonates subject to hydrolysis can take place unless special provisions are made to prevent local contact with high alkalinity or acidity, and unless effective cooling means are provided to withdraw the high heat of reaction, which promotes hydrolysis of vulnerable products. Another of these is that this method of neutralization in all cases causes undesirable darkening of the organic material. A still further drawback is that the neutralized product necessarily contains a high percentage of inorganic sulphate salt, which imposes limitations on formulation of built synthetic detergents compositions and necessitates a separate purification operation for many applications of the organic sulphonate.

Various attempts have been made to eliminate one or more of these undesirable effects, such as by means of rigid and accurate control of the neutralization, by the utilization of expensive heat exchangers to limit temperature rise, by providing special apparatus for continuously removing the neutralized material from the reaction zone, by use of efficacious methods and means of mixing the reactants to prevent localized concentrations of alkali or localized overheating, and by neutralizing in a suspension of the neutralizing agent in an organic solvent for the organic sulphonate salt in which the agent is only sparingly soluble. While these attempts have resulted in varying degrees of success none of them has solved the problems in a fully satisfactory manner.

It has now been discovered that the neutralization of crude sulphonate may be effected in a new way which satisfactorily overcomes many of the difficulties and disadvantages of prior art methods and yields a product of good color having a high percentage of active ingredient without requiring the use of specialized mechanical equipment or of cooling devices.

The new process of the present invention involves effecting or carrying out the neutralization of the acid sulphonation products in a two phase liquid system or vehicle containing the neutralizing agent. One of these phases is an organic solvent for the neutralized organic sulphonate. The other is an aqueous solution of one or more inorganic salts. The neutralizing agent is suspended or dissolved in the two phase liquid system which is agitated during the neutralizing operation.

It is preferable that inert organic solvents be selected which are usually miscible with water, or which are soluble in water in the proportions used, but which will be rendered immiscible with the other components of the neutralizing mixture by the salting-out effect of the aqueous inorganic salt solution. The aqueous solution is preferably saturated, or almost saturated, with inorganic salt at least at the end of the neutralizing reaction.

When alkaline neutralizing agents are selected which are insoluble or slightly soluble in the organic solvent phase, no appreciable alkaline hydrolysis occurs during the neutralization of materials usually subject to alkaline hydrolysis. The immediate solution of the sulphonate in the immiscible organic solvent substantially protects it from both alkaline or acid hydrolysis and eliminates occurrence of undesirable local concentrations of reactants as in the prior art.

The neutralization of the sulphonate and of the excess sulphonating agent will be effected less vigorously when the neutralizing agent is not appreciably dissolved in the liquid vehicle but is present in the form of a suspension. However, when the sulphonate is not easily susceptible to the effect of alkalinity, neutralizing agents which are soluble in one or both phases such as alkaline hydroxides may be used, either alone or along with various proportions of insoluble or sparingly soluble agents such as alkaline carbonates and/or bicarbonates. The latter have the important advantage of providing a cooling effect through the evolution of carbon dioxide, whereby the temperature of the reaction can be maintained within the desired range by controlling the rate of introduction of crude sulphonate into the alkaline neutralizing mixture. In this manner the necessity of employing the external means of cooling which would otherwise be required is avoided, although some means of cooling may also be provided if desired.

The abundance of stable foam which would ordinarily be produced by the evolution of carbon dioxide in aqueous solutions of surface-active agents would be very objectionable in a neutralizing operation; but in the presence of alcohol or similar solvent as disclosed herein, the foam which forms is unstable and readily and rapidly breaks down. This makes it possible (where it would not otherwise be) to use carbonates and/or bicarbonates as neutralizing agents in the process of the present invention, and they may be used alone, in admixture with each other, or in admixture with alkaline hydroxides, oxides or other alkaline neutralizing agents. The ease with which the temperature of the reacting mixture during the neutralization of crude sulphonates can be controlled makes it possible to effect the neutralization with simple equipment. Neutralization may be carried out under ordinary atmospheric pressure and even in open vessels, provided the loss of organic solvent is not objectionable. However, provision is ordinarily made to prevent loss of organic solvent by employing covered vessels vented through condensing equipment positioned for refluxing. Such provision is advisable to maintain the ratio of organic solvent to other components reasonably constant.

An important advantage of the process of the present invention is that the sulphonate can be obtained substantially free from inorganic salts. The neutralized organic product in the organic solvent phase will not contain substantial quantities of the inorganic products of reaction produced in the neutralization since, by a suitable choice of organic solvent and neutralizing agent, the inorganic salts formed from the neutralized excess of sulphonating agent will be precipitated or "salted-out" by the organic solvent. The substantially salt-free solution of sulphonate in organic solvent may be separated from the reaction mixture by centrifugal action or by decantation after a suitable interval to allow for spontaneous separation of the mixture into two distinct layers, the upper layer being the organic solvent solution of the sulphonate; the lower layer being a saturated aqueous solution of inorganic salts with any excess of solutes in solid form. Alternatively, the entire neutralization and product recovery can be carried out continuously by contacting proportioned streams of the crude sulphonate and the neutralizing mixture in a suitable reaction vessel and transferring the neutralized mixture thence to a centrifugal separator or to a tank of sufficient size to permit continuous decantation of the upper layer from the two layer separation which will occur spontaneously.

Another advantageous feature of the present invention is that it is possible to produce certain sulphonate salts by double decomposition in a single-step operation. In such case, the saturated aqueous inorganic salt solution which constitutes a portion of the reaction mixture becomes a chemically active component. For example, the ammonium salt of lauryl monoglyceride sulphate can conveniently be made by neutralizing the reaction mixture obtained by sulphonating glyceryl monolaurate with oleum with a slurry of sodium carbonate and/or bicarbonate in a vehicle of ethyl alcohol and saturated aqueous ammonium sulphate solution in slight stoichiometric excess. The double decomposition proceeds substantially to completion because of the high solubility of the organic ammonium salt in the ethanol phase and the almost complete insolubility of the inorganic salts in the said ethanol phase. This reaction can, in a similar manner, be carried out with any alkaline neutralizing agent, insoluble or almost insoluble in the organic solvent, and having a cation capable of being displaced from combination by the cation of the salt in the saturated aqueous solution of the neutralizing vehicle.

The organic solvents suitable for use in the process of the invention comprise all organic liquids in which the neutralized sulphonate is soluble and which do not react in an undesirable way with the other components of the neutralizing mixture. For example, short chain aliphatic alcohols such as methyl alcohol, ethyl alcohol, propyl alcohols and butyl alcohols may be used. Methyl, ethyl and isopropyl alcohols are generally preferred for economic reasons and because of their relatively low boiling points and inhibitive effect on foams. However, other suitable organic solvents or solvent mixtures may be employed, e. g., ketones such as acetone; ethers, such as dioxane, Cellosolves, Carbitol or convenient mixtures thereof. In general, organic solvents miscible with water and boiling at less than 100° C. are preferable, but the process is not limited to the use of such solvents. Thus low boiling hydrocarbons may be used in the neutralization of oil soluble sulphonates.

The neutralizing agents which may be used in the process of the invention include all substances having an alkaline reaction and, preferably, which are slightly soluble or insoluble in the organic solvent under the prevailing neutralizing conditions and do not react therewith in an undesirable manner. Examples of suitable neutralizing agents are hydroxides such as calcium and magnesium hydroxides, oxides such as calcium and magnesium oxides, salts having an alkaline reaction such as phosphates, sulphites etc., or mixtures thereof. Preferred neutralizing agents, however, are the carbonates and/or bicarbonates of sodium, potassium, ammonium and calcium. When these are used, the reaction mixture remains cooler than when other neutralizing agents such as hydroxides are used which do not produce carbon dioxide during the reaction, and external cooling of the neutralization reaction mixture can, if desired, be omitted or greatly reduced. Mixtures of alkaline hydroxides, including alkali metal and ammonium hydroxides, with carbonates and/or bicarbonates may also be employed.

The inorganic salts which, in saturated aqueous solution, form a part of the reaction mixture for the neutralization of crude sulphonates in accordance with this invention are preferably sulphates having the same cation as the neutralized sulphonate since, by their use, the requirements of saturated solution for the process are provided as a byproduct of the reaction. This is not to be construed, however, as limiting the aqueous phase of the reaction vehicle to solutions of the salts of sulphuric acid. The invention contemplates the use of salts of other acids which will not enter undesirably into the reaction and which may or may not have cations capable of replacing the cation of the neutralizing agent by double decomposition. Suitable salts include ammonium chloride and other ammonium salts, insoluble or slightly soluble in the organic solvent used, sodium chloride, sodium nitrate, potassium chloride, potassium nitrate, etc. Thus, in effect, the inorganic salt providing as saturated solution a necessary component of the neutralization mixture according to the invention shall, as requirements dictate, be either chemically non-participating or shall provide by double decomposition a cation other than that provided by the neutralizing alkali.

The optimum proportions of ingredients to be employed in the neutralization mixture will, of course, depend upon the organic solvent used and the chemical nature and solubility characteristics of the crude sulphonate being neutralized. Sufficient organic solvent should be used to dissolve all of the neutralized organic sulphonate. The ratio of the organic solvent to the other components of the mixture at completion of the neutralization should be such as to give a system wherein the organic solvent will retain a minimum of inorganic salts and the aqueous portion will retain in solution a minimum proportion of neutralized organic sulphonate. At the point where those requirements are best met, the sulphonate is also most effectively protected from hydrolysis or other detrimental side reactions. The proportion of aqueous inorganic salt solution should be such as to give a mixture of sufficient mobility that at all times throughout the neutralization a high degree of turbulence can be easily maintained by conventional methods of agitation.

Neutralization involves not only the organic sulphonate but also the excess of sulphonating agent. In order to recover the sulphonated organic product from the neutralized mixture in good yield and reasonable purity, it is required that the neutralized organic sulphonate be soluble in the organic solvent and that the neutralized excess of sulphonating agent be insoluble or only slightly soluble in the organic solvent phase. Generally, in this process the neutralized sulphonate will be present at completion of the neutralization in solution in the organic solvent phase whereas the neutralized excess of sulphonating agent will be present in precipitated form associated with the saturated aqueous phase. The organic sulphonate can readily be recovered from the neutralization mixture by centrifugal separation or by allowing spontaneous separation of the phases into two separate layers to take place, whereupon the upper layer containing the organic solvent solution of the sulphonate can be withdrawn for subsequent processing. Sulphonate substantially free from inorganic salts can be recovered by evaporation of the solvent contained in the upper layer, i. e., in the portion of the neutralized mixture comprising the organic solvent solution of the sulphonate or, where it is desirable to utilize the sulphonate in admixture with inorganic salt, the desired proportion of inorganic salt is available in the lower layer, i. e., in the inorganic portion of the neutralized mixture, to produce a detergent having any desired ratio of active ingredient to inorganic salt.

The process of the present invention may be used to effect the neutralization of all kinds of "crude sulphonates" (within the meaning of this term as hereinbefore defined), such as sulphated mono and di-glycerides of higher fatty acids; sulphated higher fatty alcohols; the higher fatty acid esters of lower molecular weight alkylol sulphonic acids, e. g., the oleic acid ester of isethionic acid (the sodium salt being known as "Igepon A"); the higher fatty alcohol esters of supphocarboxylic acids, e. g., dioctyl sulphosuccinate (the sodium salt being known as "Aerosol OT"); hydroxysulphonated fatty acid esters, e. g., the lauryl ester of 2,3 dihydroxypropane sulphonic acid; alkylated aryl sulphonates, e. g., dodecyl benzene sulphonate, butyl naphthalene sulphonate; sulphonated mineral oil extracts such as the liquid sulphur dioxide extracts of petroleum oils; saturated aliphatic sulphonyl chlorides such as are obtained by subjecting higher paraffins to the action of gaseous chlorine and sulphur dioxide under actinic light; sulphonated fatty acids or glycerides, mahogany sulphonates, etc. The process is particularly applicable where any hydrolysis or other undesirable side reactions may occur during neutralization of surface active agents, but it is specifically intended that the process may also be used advantageously in the neutralization of other acidic sulphonates where similar difficulties as regards hydrolysis, decomposition reactions and/or control of heat of reaction are involved.

The following examples serve to illustrate the invention, it being understood that the same is not to be restricted specifically thereto:

EXAMPLE I 24 kilograms of the acid reaction mixture obtained by the sulphation of coconut oil monoglycerides with oleum is introduced in a thin stream with simultaneous stirring into 15.9 kilograms of sodium carbonate (soda ash) slurried in a two phase liquid vehicle comprising 13.0 kilograms of 95% ethanol, 15 kilograms of saturated aqeous sodium sulphate solution and 32 kilograms of water. The neutralization takes place rapidly and the sodium sulphate resulting from neutralization of the excess sulphonating agent quickly re-saturates the aqueous phase of the mixture. Evolution of carbon dioxide keeps the temperature within usually acceptable limits (45 to 50° C.) but where lower temperatures are desired for any reason, these can be maintained by suitable adjustment in the rate of acid flow or by employing a heat exchanger which may have a small ratio of cooling capacity to batch volume. The immiscibility of the ethanol solution of the neutralized organic sulphonate with the balance of the reaction mixture, and the comparatively small amount of carbonate in solution, prevents any significant degree of alkaline or acid hydrolysis. When neutralization is complete, separation into two layers rapidly follows cessation of stirring. The pH of the upper layer, which contains substantially salt-free sulphated product dissolved in dilute ethanol, is adjusted if necessary, to about 5.8–6.2. The lower layer, which contains an excess of sodium sulphate dissolved in water, may be withdrawn from the bottom of the reaction vessel, or the upper layer may be decanted. The sodium sulphate solution for the next batch is supplied from the lower layer. The upper layer may be dried by use of a roll drier or may be spray dried, preferably under conditions permitting recovery of the ethanol for reuse.

In this and in the examples which follow the neutralization reaction is carried out in a tightly covered vessel, vented through a reflux condenser, with total reflux of organic solvent. The reaction can be carried out in an open vessel but since the carbonate neutralizations are subject to loss of volatile organic solvents which must be replaced to maintain the proper ratio of organic solvent to other components, this manner of operation is not usually preferred.

EXAMPLE II

A slurry of 16.2 kilograms of sodium carbonate (soda ash) in a liquid vehicle comprising 8.1 kilograms of 95% ethanol and 51.2 kilograms of saturated ammonium sulphate solution is prepared and 24.6 kilograms of the acid reaction mixture obtained by sulphonating coconut oil monoglycerides are run into the mixture with simultaneous stirring. When neutralization is completed the stirring is discontinued and a two-layer separation follows, as in Example I. The pH of the upper layer should be adjusted upon completion of neutralization to about 5.8–6.2, and by adjusting the solids content to about 20% an excellent shampoo is obtained. As in Example I, external cooling is optional.

EXAMPLE III

A slurry of 7.9 kilograms of soda ash and 12.6 kilograms of sodium bicarbonate in a liquid vehicle comprising 14 kilograms of isopropyl alcohol, 15 kilograms of saturated sodium sulphate solution and 33 kilograms of water is prepared. Into this slurry 24 kilograms of the acid reaction mixture obtained by sulphonating coconut oil monoglycerides is run, with simultaneous stirring at such rate as to maintain the temperature between 35 and 45° C. The sodium sulphate resulting from neutralization of the excess sulphonating agent rapidly re-saturates the mixture, thus maintaining immiscibility of the isopropanol by "salting-out" effect. Upon completion of neutralization the mixture is centrifugally separated into two portions comprising sodium coconut monoglyceride sulphate in dilute isopropanol solution, and sodium sulphate solution containing an excess of solute. After adjustment of the pH of the active ingredient solution to about 5.8–6.2, it is ready for any desired form of subsequent processing.

EXAMPLE IV

A slurry of 27.6 kilograms of ammonium bicarbonate in a liquid vehicle comprising 9.2 kilograms of 95% ethanol, 27.6 kilograms of saturated ammonium sulphate solution and 7.4 kilograms of water is prepared. Into this slurry is run with simultaneous stirring, 28.2 kilograms of the acid reaction product obtained by sulphonating coconut oil monoglycerides. The course of the neutralization and the subsequent treatment are as described in the preceding examples, excepting that because of the large volume of carbon dioxide available from the bicarbonate, any form of external cooling is superfluous.

EXAMPLE V

The process of Example IV is repeated except that 19.9 kilograms of ammonium carbonate monohydrate are used instead of the ammonium bicarbonate. The reaction mixture rises to a somewhat higher temperature for the same rate of introduction of the crude sulphonate but external cooling was not necessary to keep the temperature below the point of serious darkening of the product.

EXAMPLE VI

A quantity of the acid reaction product obtained by sulphating dodecyl alcohol, which contains free sulphuric acid, is neutralized with the requisite amount of soda ash as described in Example I, the liquid vehicle in this case comprising 25% ethanol (95%), 23% saturated sodium sulphate solution and 52% water. After neutralization, the alcoholic solution of sodium dodecyl sulphate which separates is adjusted to a pH of about 6.0–6.2.

EXAMPLE VII

A slurry of 7.1 kilograms of calcium hydroxide and 9.1 kilograms sodium bicarbonate in 16 kilograms of 95% ethanol and 50 kilograms of saturated sodium sulphate solution is prepared and 24 kilograms of the acid reaction product obtained by sulphonating coconut oil monoglycerides is slowly poured into this mixture which is cooled by the evolution of carbon dioxide from the bicarbonate. When neutralization is complete, the two liquid phases are separated as in Example I. The upper layer contains the sodium salt of the monoglyceride sulphate, formed in part by double decomposition of the calcium salt with the sodium sulphate in the reaction vehicle, and the lower layer contains calcium sulphate and excess sodium sulphate.

EXAMPLE VIII

A slurry is prepared by mixing 14.5 kilograms of soda ash, 13.6 kilograms of saturated sodium sulphate solution in water, 12.0 kilograms of isopropanol and 30.5 kilograms of water. While this slurry is being agitated there is introduced as a thin stream 29.4 kilograms of the acid reaction product obtained by the sulphonation of an alkylated benzene in which the alkyl radical has an average chain length of about 12 carbon atoms. No cooling is required and the rate of feed of the acid reaction product is governed only by the efficiency of mixing. When neutralization is complete, separation into two layers follows cessation of mixing as in previous examples. The product may be recovered as substantially pure active ingredient by separating the upper layer from the lower layer and evaporating the solvent from the former. If a built detergent composition is to be produced, various additives may be mixed with the upper layer and, if desired, part or all of the lower layer may also be included in the mixture which may be dried by any suitable means to form a solid detergent composition.

By the process of the present invention, as illustrated in the foregoing examples, sulphonated detergents are obtained which are substantially free from products of decomposition resulting from saponification and/or hydrolysis. The process makes it possible to obtain detergents having a high ratio of active ingredient (the organic sulphonate salt) to other ingredients without substantial loss of the active ingredient. Yields are, therefore, higher and the products are clearly soluble in water. As illustrations of the results which can be obtained, the following analyses of typical runs following the procedure of Examples I and II are given:

*Table of typical analyses*

|  | Example I | Example II |
|---|---|---|
|  | Percent | Percent |
| Upper Layer: |  |  |
| Alcohol | 24.3 | 25.8 |
| Alcohol Insoluble [1] | 1.3  *4.1 | 1.63  *3.7 |
| Ether Soluble [2] | 1.1  *3.5 | 1.62  *3.7 |
| Alcohol Soluble [3] | 29.2  *92.4 | 40.65  *92.6 |
| Water | 44.1 | 30.3 |
| Lower Layer: |  |  |
| Alcohol | 1.7 | 3.5 |
| Alcohol Insoluble [1] | 53.0 | 34.9 |
| Ether Soluble [2] | 0.3 | 0.4 |
| Alcohol Soluble [3] | 3.9 | 3.2 |
| Water | 41.1 | 58.0 |

*Dry basis.
[1] Inorganic salts.
[2] Unsulphated organic material.
[3] Active ingredient.

The products obtained in this manner can be used, for instance, as washing, emulsifying, wetting and frothing agents in solid or liquid form or in combination with other substances such as fillers, builders, perfume and other additives having or imparting desirable properties for the use intended.

Although the present invention has been described and illustrated with reference to certain specific examples, it will be understood that modifications and variations can be made without departing from the spirit and scope of the invention as set forth in the following claims.

What is claimed is:

1. The process of neutralizing acid sulfonation products containing an organic acid selected from the group consisting of organic sulfonic acids and sulfuric acid esters and unreacted sulfonating agent to prepare a salt of the organic acid substantially free of inorganic salt which comprises preparing a two phase liquid vehicle containing a neutralizing agent, one phase of said vehicle comprising an equeous solution of an inorganic salt and the other phase of said vehicle comprising an inert organic solvent for the neutralized organic acid, said inorganic salt having an anion selected from the group consisting of sulfates, chlorides, and nitrates and said organic solvent being immiscible with the aqueous inorganic salt solution, and introducing the said sulfonation products into said two phase liquid vehicle under turbulent conditions to effect neutralization.

2. The process of neutralizing acid sulphonation products as set forth in claim 1 in which the aqueous solution is saturated, at least at the end of the neutralising reaction, with inorganic salt.

3. The process of neutralizing acid sulphonation products as set forth in claim 1 in which the inorganic salt is the sulphate of the cation of the neutralizing agent.

4. The process of neutralizing acid sulphonation products as set forth in claim 3 in which the aqueous solution of inorganic salt is recovered from the aqueous phase of a previous neutralization.

5. The process of neutralizing acid sulphonation products as set forth in claim 1 in which the cation of the inorganic salt is capable of replacing the cation of the neutralizing agent in the neutralization of the acid sulphonation products.

6. The process of neutralizing acid sulphonation products as set forth in claim 1 in which the neutralizing agent is at most only slightly soluble in the vehicle in which it is suspended in finely divided form.

7. The process of neutralizing acid sulphonation products as set forth in claim 1 in which the neutralizing agent is a carbonate.

8. The process of neutralizing acid sulphonation products as set forth in claim 7 in which the neutralizing agent is a mixture of sodium carbonate and bicarbonate.

9. The process of neutralizing acid slphonation products as set forth in claim 7 in which the neutralizing agent is soda ash and the inorganic salt is ammonium sulphate in stoichiometric excess over the total amount of sodium in the reaction mixture.

10. The process of neutralizing acid sulphonation products as set forth in claim 1 in which the organic solvent is miscible with water but immiscible with the aqueous inorganic salt solution.

11. The process of neutralizing acid sulphonation products as set forth in claim 1 in which the organic solvent is a short chain saturated aliphatic monohydric alcohol or mixture thereof.

12. The process of neutralizing acid sulphonation products as set forth in claim 1 in which the acid sulphonation product is sulphated coconut oil monoglycerides.

13. The process of neutralizing acid sulphonation products as set forth in claim 1 in which the acid sulphonation product is sulphated fatty alcohol.

14. The process of neutralizing acid sulphonation products as set forth in claim 1 in which the acid sulphonation product is an alkyl substituted aromatic sulphonate.

15. The process of neutralizing acid sulphonation products as set forth in claim 1 in which the neutralizing agent yields a gas during neutralization and the reaction is performed in a closed vessel vented through a reflux condenser for returning vaporized solvent to the vessel.

16. The process of neutralizing acid sulphonation products as set forth in claim 1 in which the acid sulphonation products are introduced into the vehicle at a rate which limits temperature rise to a point which does not cause substantial darkening of the neutralized organic sulphonate.

FREDERICK W. TRUSLER.

References Cited in the file of this patent

UNITED STATES PATENTS

| Number | Name | Date |
|---|---|---|
| 1,876,768 | Seltzer | Sept. 13, 1932 |
| 2,078,638 | Reibnitz | Apr. 27, 1937 |
| 2,187,144 | Bell | Jan. 16, 1940 |
| 2,192,721 | Toone | Mar. 5, 1940 |
| 2,210,175 | Muncie | Aug. 6, 1940 |
| 2,316,719 | Russell | Apr. 13, 1943 |
| 2,325,320 | Holuba | July 27, 1943 |
| 2,460,968 | Bert | Feb. 8, 1949 |
| 2,511,043 | Busch | June 13, 1950 |